United States Patent
Cordts

(10) Patent No.: US 8,146,305 B2
(45) Date of Patent: Apr. 3, 2012

(54) PASS-THROUGH FIRESTOP APPARATUS AND METHODS

(75) Inventor: Brandon L. Cordts, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 13/214,463

(22) Filed: Aug. 22, 2011

(65) Prior Publication Data

US 2011/0302860 A1    Dec. 15, 2011

Related U.S. Application Data

(62) Division of application No. 12/182,548, filed on Jul. 30, 2008, now Pat. No. 8,024,900.

(51) Int. Cl.
| | |
|---|---|
| E04C 2/52 | (2006.01) |
| E04C 1/00 | (2006.01) |
| E04C 2/00 | (2006.01) |
| E04B 1/00 | (2006.01) |

(52) U.S. Cl. .............. 52/220.8; 52/745.05; 52/309.1; 52/309.17; 52/232

(58) Field of Classification Search ............. 52/220.8, 52/745.05, 309.17, 309.1, 317, 232
See application file for complete search history.

(56) References Cited

U.S. PATENT DOCUMENTS

| | | | | |
|---|---|---|---|---|
| 3,933,336 A | * | 1/1976 | Tolf, Jr. | 249/177 |
| 4,669,756 A | * | 6/1987 | Cassaday et al. | 285/24 |
| 4,669,759 A | * | 6/1987 | Harbeke | 285/136.1 |
| 4,748,787 A | * | 6/1988 | Harbeke | 52/741.3 |
| 5,390,465 A | * | 2/1995 | Rajecki | 52/741.3 |
| 5,498,466 A | * | 3/1996 | Navarro et al. | 428/408 |
| 6,176,052 B1 | * | 1/2001 | Takahashi | 52/232 |
| 6,305,133 B1 | * | 10/2001 | Cornwall | 52/232 |
| 6,336,297 B1 | * | 1/2002 | Cornwall | 52/232 |
| 6,368,670 B1 | * | 4/2002 | Frost et al. | 427/385.5 |
| 6,405,502 B1 | * | 6/2002 | Cornwall | 52/220.8 |
| 6,470,635 B2 | * | 10/2002 | Cornwall | 52/220.8 |
| 6,698,146 B2 | * | 3/2004 | Morgan et al. | 52/232 |
| 6,928,777 B2 | * | 8/2005 | Cordts | 52/220.8 |
| 7,070,653 B2 | * | 7/2006 | Frost et al. | 118/300 |
| 7,080,486 B2 | * | 7/2006 | Radke et al. | 52/98 |
| 7,114,303 B2 | * | 10/2006 | Cordts et al. | 52/220.8 |
| 7,665,256 B2 | * | 2/2010 | Miller et al. | 52/220.8 |
| 7,810,847 B1 | * | 10/2010 | Cornwall | 285/230 |
| 2004/0211138 A1 | * | 10/2004 | Sakno | 52/298 |

FOREIGN PATENT DOCUMENTS

| | | |
|---|---|---|
| KR | 10-2008-0064500 A | 7/2008 |
| WO | WO 02/057676 A1 | 7/2002 |

OTHER PUBLICATIONS

International Search Report, PCT/US2009/048544, Feb. 11, 2010, 4 Pages.

* cited by examiner

*Primary Examiner* — Mark Wendell
(74) *Attorney, Agent, or Firm* — Kenneth B. Wood

(57) ABSTRACT

Herein are disclosed are apparatus and methods for forming firestopped through-penetrations in poured concrete partitions. The apparatus and methods use an intumescent firestop ring that can be used in combination with a removable sleeve. The firestop ring is detachably mounted on the outer surface of the sleeve form, near one end of the sleeve. The sleeve is positioned and concrete poured around it. After solidification of the concrete the sleeve can be removed to provide a through-penetration containing the firestop ring, secured to the solidified concrete. The firestop ring may optionally comprise one or more retainers and/or one or more insulating spacers.

22 Claims, 10 Drawing Sheets

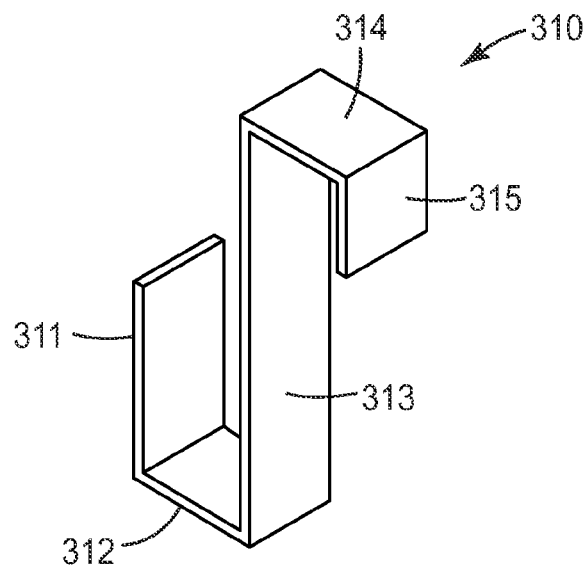
FIG. 4a
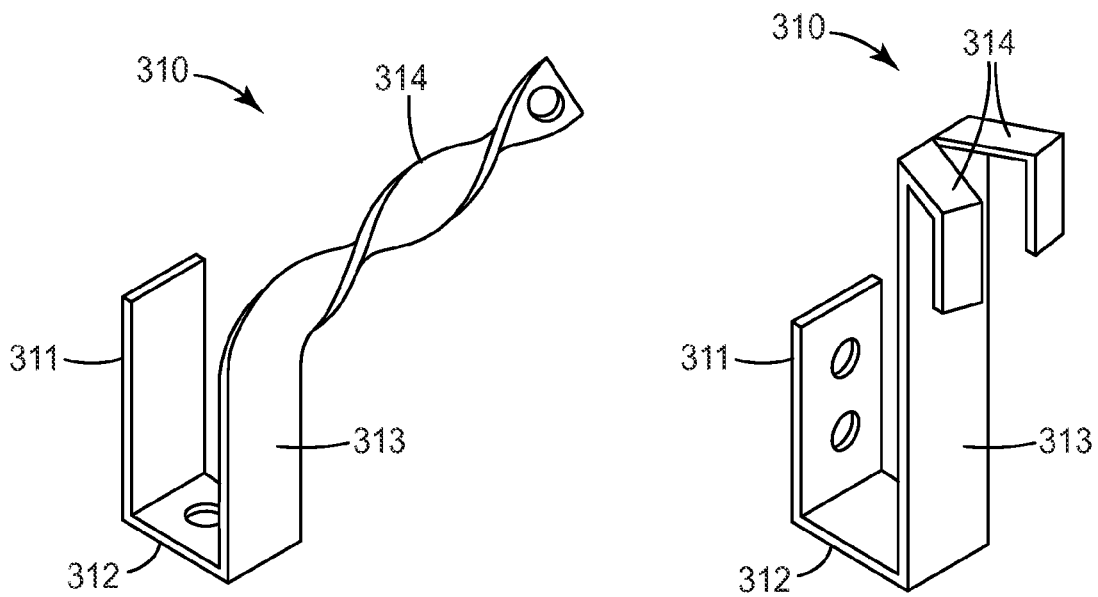
FIG. 4b
FIG. 4c

PASS-THROUGH FIRESTOP APPARATUS AND METHODS

CROSS-REFERENCE TO RELATED APPLICATIONS

This application is a divisional of U.S. patent application Ser. No. 12/182,548, filed Jul. 30, 2008 (now allowed) now U.S. Pat. No. 8,024,900, the disclosure of which is incorporated herein by reference in its entirety.

BACKGROUND

During the construction of buildings, it is often necessary to provide openings or passages (often referred to as through-penetrations) through the building floors, walls, and ceilings to permit the running of pipes, wires, cables, and the like. Such through-penetrations in poured concrete partitions may be formed by various techniques, including drilling holes in the partition after it has been formed and solidified; or, positioning a forming device (typically referred to as a sleeve) before the concrete is poured and then removing the device after the concrete has solidified, to leave behind a through-penetration.

Such through-penetrations may provide a mechanism by which fire and smoke may spread from one compartment of the building to another. Thus, it is common to "firestop" such through-penetrations by providing, within the through-penetration, intumescent firestop materials which, upon exposure to sufficiently high temperature, can expand to close off the through-penetration. In one approach, a firestop material is placed in the through-penetration after the formation of the through-penetration and/or placement of a pipe through the through-penetration. An alternative approach involves the use of a so-called cast-in-place firestop device. Such a device is typically preloaded with firestop material (with room being left for insertion of a pipe through the firestop device) and is placed in position prior to pouring concrete, and remains permanently in place upon solidification of the concrete. Such devices are described in e.g., U.S. Pat. No. 7,080,486 to Radke et al.

SUMMARY

Herein are disclosed apparatus and methods for forming firestopped through-penetrations in poured concrete partitions. The apparatus and methods described herein may be used in combination with conventional methods of forming through-penetrations in concrete. Such methods often rely on a removable sleeve which is positioned and liquid concrete then poured around it. Removal of the sleeve (after solidification of the concrete) leaves behind a through-penetrating void in the solidified concrete.

According to the disclosures provided herein, an intumescent firestop ring is detachably mounted on the outer surface of a removable sleeve, near one end of the sleeve. Upon pouring of concrete around the sleeve and solidification of the concrete, the intumescent firestop ring becomes secured to the concrete. Upon removal of the sleeve, the firestop ring remains in place attached to the concrete. Thus is provided a through-penetrating void space containing an annular ring of firestop material.

In providing a firestopped through-penetration in a single operation, the disclosures presented herein are advantageous over conventional approaches in which a through-penetration is provided in a first operation and is then firestopped in a subsequent operation. Additionally, the apparatus disclosed herein are less complex, and are easier to manufacture, than conventional cast-in-place firestop products.

In one embodiment, a firestop ring as disclosed herein can comprise at least one retainer that enhances the securing of the firestop ring to the solidified concrete. In various embodiments, the retainer can comprise a retaining bracket or a porous retaining sheet.

In one embodiment, a firestop ring as disclosed herein can comprise at least one insulating spacer. In a further embodiment, the insulting spacer comprises an at least partially air-filled material. In a particular embodiment, the at least partially air-filled material is transmissive to air along at least one dimension and has at least one surface open to the atmosphere so as to allow entry of air, and also has at least one dimension along which the material is substantially resistant to the transmission of liquid concrete. In an alternative embodiment, a firestop ring as disclosed herein can comprise at least one removable spacer, which can be removed after pouring and solidifying of concrete, so as to leave behind an air-filled cavity between at least a portion of the firestop ring and the solidified concrete.

Thus in one aspect, herein is disclosed a method for creating a firestopped through-penetration in a poured, solidified concrete partition, comprising: providing a removable sleeve with an outer surface and a widest end and a narrowest end, detachably mounting an intumescent firestop ring on the outer surface of the sleeve, adjacent the widest end of the sleeve; positioning the sleeve on a form; pouring liquid concrete around the sleeve and firestop ring; solidifying the concrete such that the firestop ring is securely held by the concrete; and, removing the sleeve from the solidified concrete to provide a through-penetration at least partially defined by the shape of the sleeve, wherein removing the sleeve from the solidified concrete causes the firestop ring to be detached from the sleeve and to remain in place in the through-penetration, securely held by the solidified concrete.

In another aspect, herein is disclosed an apparatus for creating a firestopped through-penetration in a poured, solidified concrete partition, comprising: a removable sleeve with an outer surface and a widest end and a narrowest end; and, an intumescent firestop ring detachably mounted on the outer surface of the sleeve, adjacent the widest end of the sleeve; wherein the sleeve is configured to create a through-penetration in a poured concrete partition, and, wherein the sleeve and ring are arranged such that removal of the sleeve from the poured, solidified concrete partition detaches the firestop ring from the sleeve thus providing a through-penetration with an intumescent firestop ring positioned within the through-penetration.

In still another aspect, herein is disclosed a kit for providing a firestopped through-penetration in a poured, solidified concrete partition, the kit comprising: at least one intumescent firestop ring having at least an outer surface and configured to be detachably mounted to the outer surface of a removable elongate sleeve; and, at least one retainer configured to be secured to the firestop ring, wherein the retainer comprises at least a protruding portion that, when the retainer is secured to the firestop ring, protrudes outward with respect to the outer surface of the firestop ring so as to be able to be at least partially encapsulated by, or at least partially penetrated by, liquid concrete, such that upon solidification of the liquid concrete the retainer and the firestop ring are securely held by the solidified concrete.

DRAWINGS

FIGS. 4a-4d are perspective views of exemplary retaining brackets.

Figure 1:
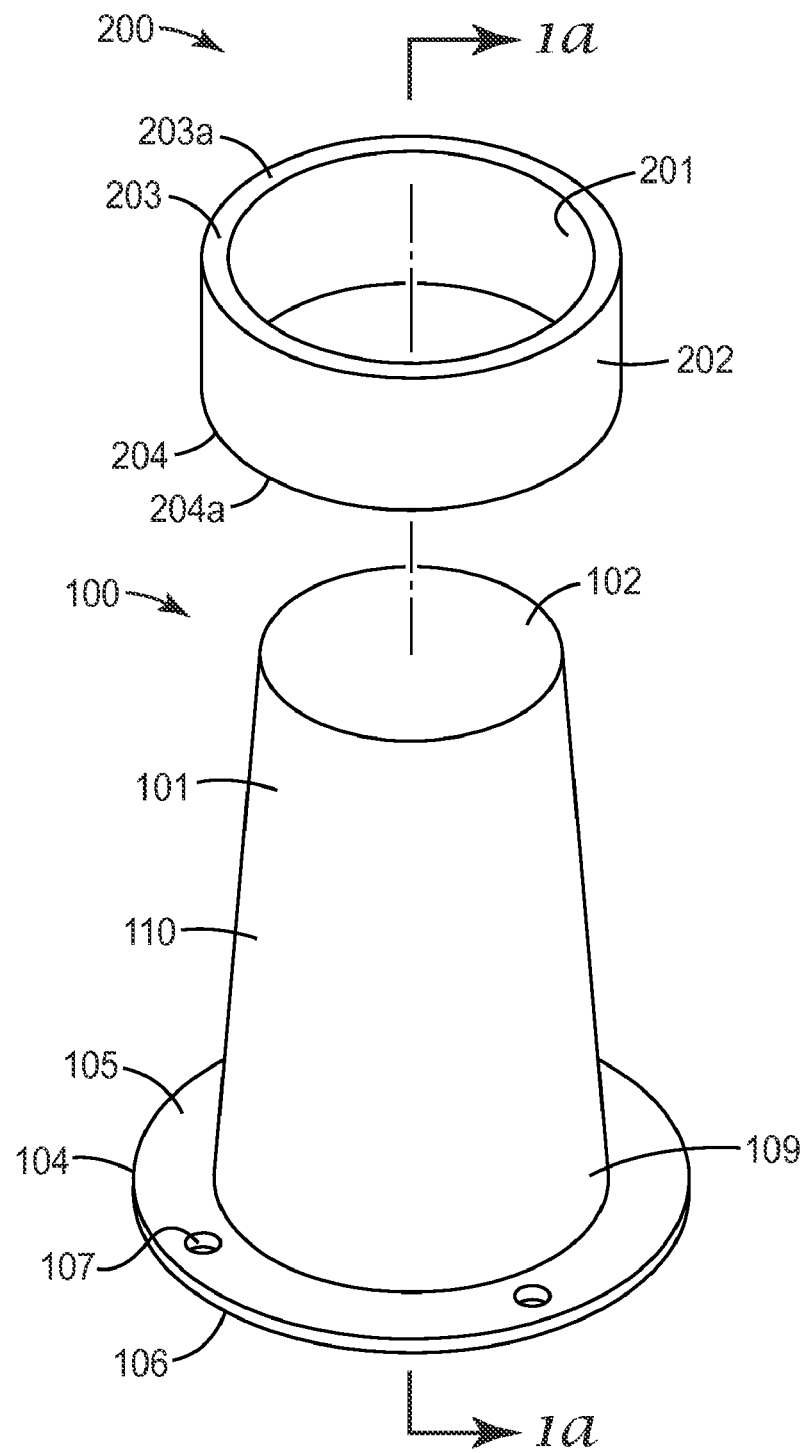
FIG. 1 is an exploded perspective view of an exemplary firestop ring and sleeve.

Drawings and elements therein are not to scale unless noted. In the Figures, like reference numerals are used to designate like features throughout. Although terms such as "top", "bottom", "upper", "lower", "over", "under", "front", "back", and "first" and "second" may be used in this disclosure, it should be understood that those terms are used in their relative sense only, unless noted herein.

DETAILED DESCRIPTION

Disclosed herein are apparatus and methods for forming firestopped through-penetrations. The apparatus and methods disclosed herein may be used in combination with conventional methods of forming through-penetrations (e.g., holes) in concrete. Such methods often rely on a removable sleeve (often referred to as a pipe sleeve, a sleeving form, etc.) 100, shown in an exemplary manner in FIGS. 1, 2 and 3. In the context of the present disclosures, the term "removable" signifies that sleeve 100 is designed and configured such that it can be removed from solidified concrete (and is often so removed in typical use). With references to FIGS. 1 and 1a, removable sleeve 100 typically comprises a tubular main body 110 with outer surface 101. Often, main body 110 is elongated and/or slightly tapered, so as to comprise a frusto-conical shape with widest end 103 and narrowest end 102 (with the terms "widest" and "narrowest" being with respect to the relative diameter of the two ends). This tapered configuration can enhance the ease of removal of sleeve 100 from solidified concrete, and/or can enhance the ease of stacking sleeves 100 for packaging. Often, widest end 103 will be open, and narrowest end 102 will be closed (as depicted in FIG. 1a), so as to define a volume 108. Often, sleeve 100 will comprise a flange 104 extending radially outward from main body 110 at widest end 103 (again, as depicted in FIG. 1a).

Figure 2:
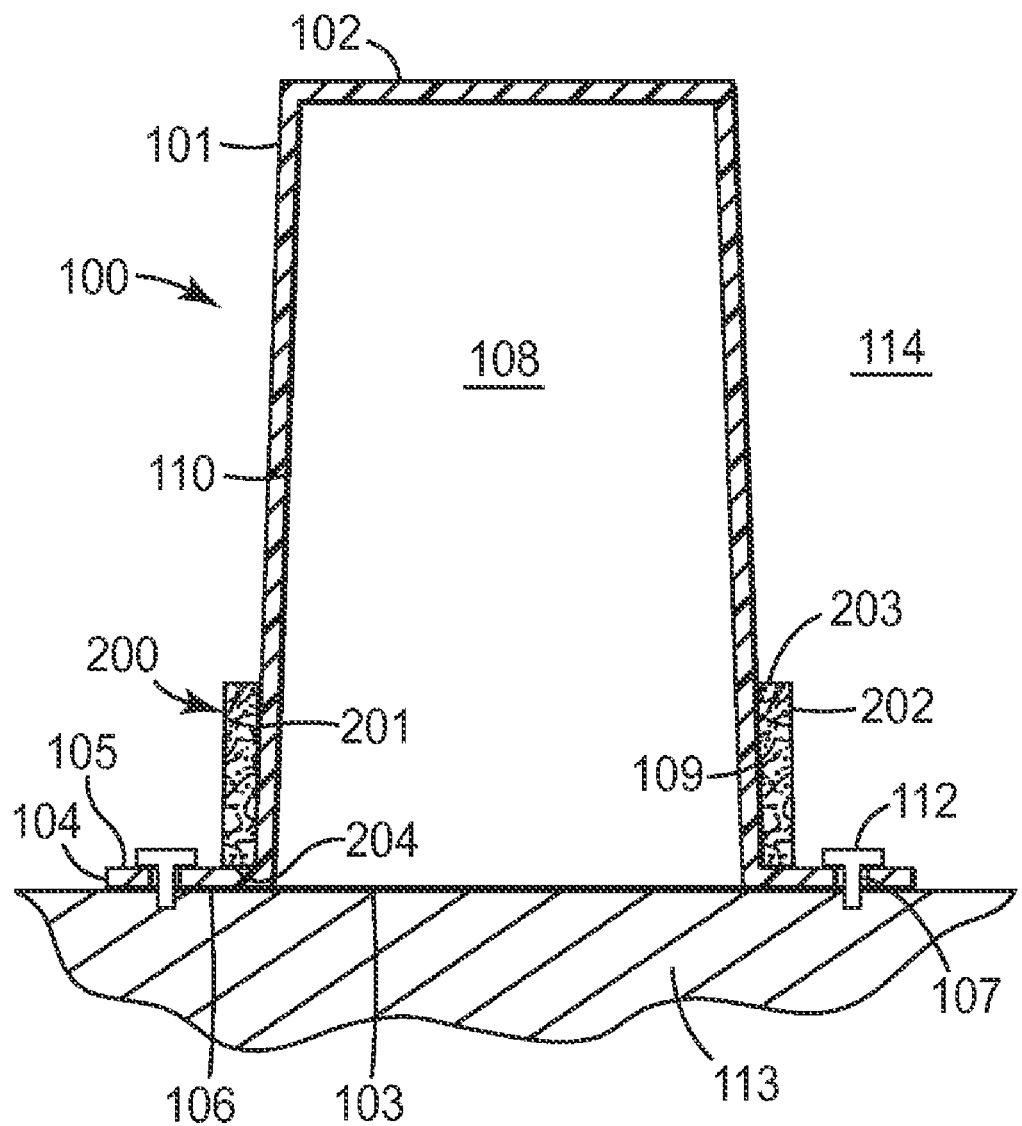
FIG. 2 is a cross sectional view of an exemplary firestop ring positioned on an exemplary sleeve.

Removable sleeve 100 is often provided as an integrally molded plastic unit (e.g., the products available from Crete-Sleeve, West St. Paul, Minn., under the designation CRETE-SLEEVE FORM, the products available from Deslauriers, Lakewood, N.J., under the designation ECON-O-SLEEVE, and the like). In typical use, sleeve 100 is placed upon form 113 (which is typically plywood or the like) with widest end 103 proximal to form 113, as shown in FIG. 2. Often, sleeve 100 is attached to form 113 by the use of attachment member (e.g., nail, screw, etc.) 112 which passes through hole 107 in flange 104 and into form 113. Upon the pouring of liquid (i.e., pourable) concrete onto form 113 in the space 114 around sleeve 100, sleeve 100 creates a void volume which remains upon the solidification of the concrete. Upon subsequent removal of form 113 and removal of sleeve 100 (which may be removed along with form 113 or may be removed later, e.g. by applying force to narrowest end 102 to expel sleeve 100), the void volume established by sleeve 100 provides a ready-made through-penetration in the solidified concrete though which a pipe or other item may be passed.

Although the term "pipe" is used generally herein, it is noted that this term is intended to broadly refer to any pipe, tube, cable, conduit, wire, and/or collection of tubes, wires, etc., bundled or unbundled, as might be desired to pass through a through-penetration. Also, while the use of sleeve 100 is generally discussed herein with respect to being used with on removable (e.g., plywood) form 113, the methods and apparatus disclosed herein are also suitable for the providing of through-penetrations in so called fluted metal-concrete partitions in which, rather than a removable form, a permanent metal form is used. Additionally, while the methods and apparatus disclosed herein are generally discussed with respect to the formation of poured concrete partitions at construction sites, such methods and apparatus can also be used in the preparation of prefabricated concrete partitions (e.g., so-called precast concrete floors).

Intumescent firestop ring 200 is designed to detachably mate with, and to be used in combination with, removable sleeve 100 as disclosed herein. Accordingly, with reference to FIGS. 1 and 1a, firestop ring 200 comprises an annular ring in the form of an open-ended cylinder comprising inner surface 201 and outer surface 202. Firestop ring 200 further comprises upper edge 203 and lower edge 204 (which may comprise upper minor surface 203a and lower minor surface 204a, respectively). The terms "upper edge" and "lower edge" of firestop ring 200 are defined with respect to placement upon sleeve 100, with upper edge 203 being that edge that is distal to widest end 103 of sleeve 100 and lower edge 204 being that edge which is proximal to widest end 103 of sleeve 100. (Firestop ring 200 may be symmetrical, thus "upper" and "lower" edges may not be defined until ring 200 is positioned on sleeve 100). Firestop ring 200 may comprise any convenient thickness "t" (with reference to FIG. 1a). In various embodiments, thickness "t" can be about ⅛ of an inch, about ¼ of an inch, about ⅜ inch, or about ½ inch. Firestop ring 200 may be comprised of a single monolithic layer of firestop material; or, it may be comprised of two, three, or four or more layers of firestop material stacked so as to provide desired thickness "t". Firestop ring 200 may comprise any convenient height "h" (that is, its length along its axial dimension "y", with reference to FIG. 1a). In various embodiments, firestop ring 200 comprises a height "h" of at least about ½ inch, 1 inch, or 1.5 inches. In further embodiments, firestop ring 200 comprises a height "h" of at most about 3.5 inches, 3 inches, or 2.5 inches.

Firestop ring 200 comprises an inner diameter ID and an outer diameter OD, as shown in FIG. 1a. The inner diameter of firestop ring 200 can be chosen such that firestop ring 200 can be detachably mounted on a sleeve 100 of a given size, as discussed in detail later herein. Firestop rings 200 may be produced in several different sizes to be compatible with the various sizes of sleeves 100 that are customarily used. For example, if a sleeve is to be used in which the outer diameter of the sleeve is about 4 inches in ring-receiving area 109, firestop ring 200 can be designed with an inner diameter of about 4 inches.

Firestop ring 200 can be comprised of any suitable intumescent firestop material. Thus, firestop ring 200 can comprise an intumescent additive; for example, graphite (e.g., intercalated graphite, acid treated graphite, etc.), sodium silicate, vermiculite, and the like. Firestop ring 200 can be formed from any suitable commercially available intumescent product (such materials often comprise one or more intumescent additives in a fibrous matrix). Products that can be used, for example, include the products available from 3M Company, St. Paul, Minn., under the trade designation INTERAM ULTRA GS, the products available from 3M Company under the trade designation INTERAM I-10 SERIES MAT, the products available from 3M Company under the trade designation FS-195, and the like. If multiple layers of intumescent material are stacked together as described above to form the intumescent firestop ring, different intumescent materials (for example, with different expansion properties) can be used for the different layers.

Firestop ring 200 can be formed from a given intumescent firestop material by any suitable method that allows the firestop material to be held in an annular ring configuration. For example, a relatively long and narrow sheet of firestop material can be formed into an annular ring (e.g., with the two ends of the sheet brought together). In forming an annular ring configuration in this manner, the two ends can be in contact with each other (e.g., joined directly together); or they can be in proximity to each other without necessarily touching each other. The ends may be joined to each other, or held in proximity to each other, by mechanical attachment (e.g., by staples, clamps, rivets, stitches, a sleeve, a collar, etc.); by adhesive attachment (e.g., by the use of a pressure sensitive adhesive sheet that overlaps both of the ends of the ring, by the use of an adhesive such as glue, epoxy, hot melt adhesive, photocurable adhesive, and so on); by wrapping at least the joined (or adjacent) ends in an encapsulating layer, and so on.

Firestop ring 200 can optionally comprise one or more cover layers (not pictured in any Figure) on a portion or all of inner surface 201, outer surface 202, upper minor surface 203a, and/or lower minor surface 204a. Such layers may be present for any suitable purpose, and may serve several purposes. For example, inner surface 201 can have a cover layer that helps to protect the firestop material (e.g., from being damaged as a pipe is inserted through the opening in firestop ring 200). Or, inner surface 201 can have a cover layer that enhances the release of firestop ring 200 from sleeve 100 when it is desired to remove sleeve 100 after solidification of the concrete. Or, a given layer can serve both functions.

Such cover layers may comprise one or more coatings; or, they may comprise a layer or layers (e.g., a film, nonwoven, etc.) that is applied to the intumescent material and bonded thereto, for example by the use of a pressure sensitive adhesive.

Outer surface 202 can also comprise one or more cover layers as desired. Such layers may serve a protective function, and/or a decorative function, and/or may serve to enhance the ability of concrete to bond to the firestop ring, for example.

Any such cover layers present upon inner surface 201 and/or outer surface 202 may be most easily applied to the firestop material when it is in sheet form (prior to formation of the annular ring). Often, such layers are present on intumescent products as received from the manufacturer.

Notwithstanding the presence or absence of optional layers as described above, one or more layers (not shown in any Figure) may optionally applied be to the firestop material when the firestop material is in the form of a ring; or, prior to or in the process of forming the firestop material into a ring. Such layers may thus cover not only inner surface 201 and outer surface 202, but may also cover upper minor surface 203a and lower minor surface 204a. Such coverings may provide enhanced protection of the intumescent material against damage in the course of installing the sleeve, removing the sleeve from the solidified concrete, running a pipe through the firestopped through-penetration, and so on. Such coverings may also provide a useful method of maintaining the firestop material in the ring configuration. For example, a relatively long and narrow sheet (or stack of sheets) of firestop material may be formed into an annular ring then partially or completely encapsulated (e.g., wrapped) in one or more covering materials. Such a covering or encapsulant material may comprise, for example, any or all of a metal foil layer, a plastic layer, a scrim layer, an adhesive layer, and so on.

As mentioned, this encapsulation can aid in maintaining the firestop material in the above-described annular ring configuration; it can also serve a protective purpose, can serve a decorative purpose, can provide an enhanced ability for concrete to bond to it, and so on. Any such layer, coating, encapsulant, wrapping, etc., whether applied to the firestop material prior to, during, or after ring formation, should however not unacceptably detract from the ability of the firestop ring to adequately perform its firestopping function (e.g., such coatings etc. should not unduly restrict the ability of the intumescent firestop material to expand upon exposure to high temperatures). In particular, such coatings etc. should not unacceptably detract from the ability of the firestop material to pass any desired test of firestopping ability, as detailed later herein.

Figure 1A:
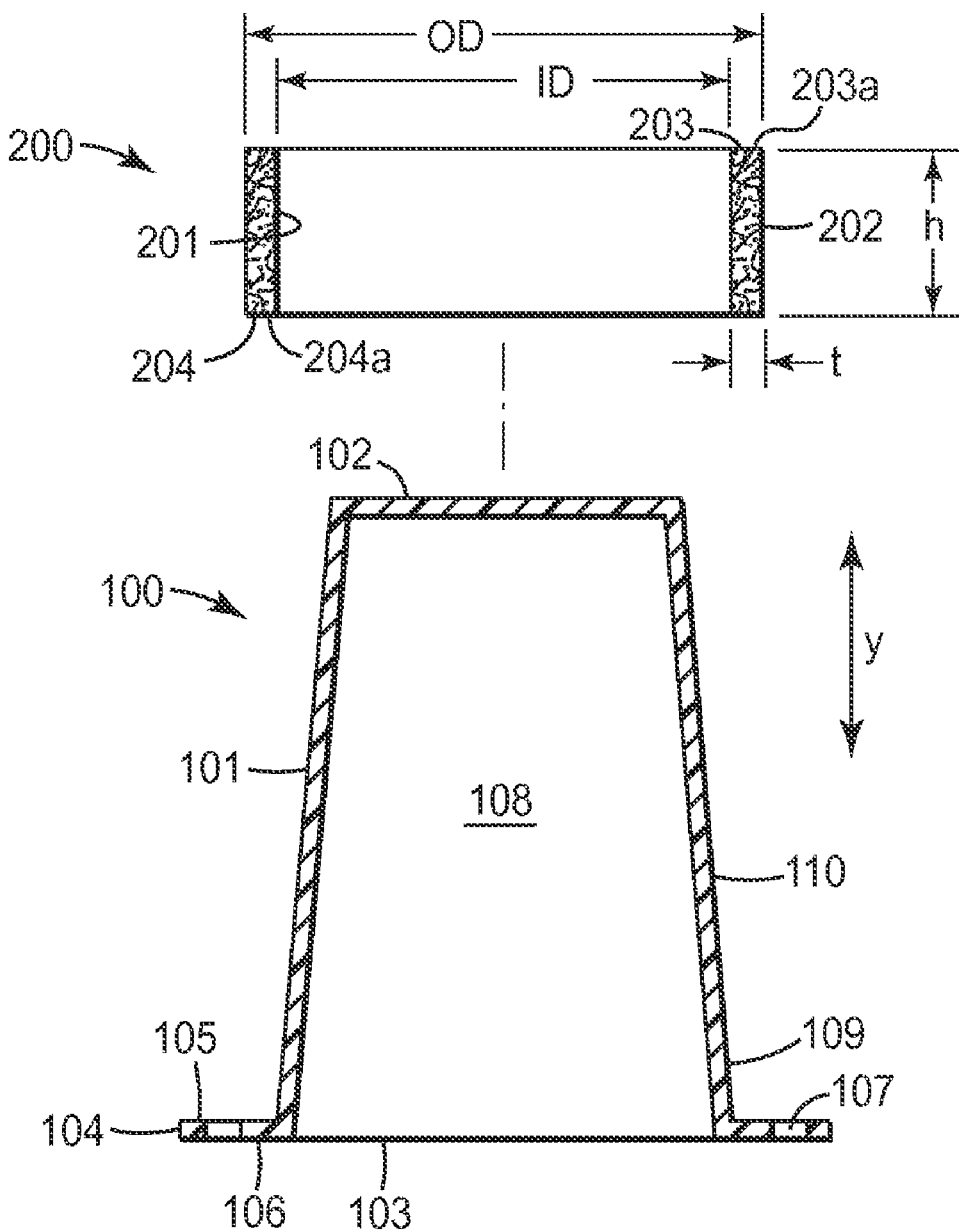
FIG. 1a is a cross sectional view of an exemplary firestop ring and sleeve, taken along line 1a of FIG. 1.

In use, firestop ring 200 is designed and sized such that it can be slidably mounted onto the outer surface 101 of sleeve 100 such that it is detachably placed in position upon firestop ring-receiving area 109 of sleeve 100 (as shown in FIGS. 1-2). Firestop ring 200 may be detachably held in place at least partially by the presence of flange 104 (in the event that firestop ring 200 is placed such that lower edge 204 of firestop ring 200 is in contact with upper surface 105 of flange 104. Or, firestop ring 200 may be detachably held in place at least partially by a friction fit owing to pressure exerted by outer surface 101 of sleeve 100 in ring-receiving area 109, onto inner surface 201 of firestop ring 200. Or, some combination of both mechanisms may be employed.

Firestop ring 200 is thus detachably mounted onto ring-receiving area 109 of outer surface 101 of sleeve 100. By "detachably" is meant that firestop ring 200 is mounted upon sleeve 100 such that firestop ring 200 is not dislodged from sleeve 100 by the act of pouring liquid concrete around the sleeve/firestop ring assembly, yet such that when desired (i.e., after solidification of the concrete), firestop ring 200 and sleeve 100 can be detached from each other (e.g., by application of sufficient force to sleeve 100 while firestop ring 200 is held by the solidified concrete) without damaging or destroying firestop ring 200.

As noted herein, sleeve 100 is often slightly tapered. If present, this tapering may be taken into account when designing the size (inner diameter, height, etc.) and other properties of firestop ring 200. In particular, firestop ring 200 may be designed, in view of the taper of sleeve 100, such that the ability of liquid concrete to penetrate in between inner surface 201 of firestop ring 200, and outer surface 101 of sleeve 100, in ring-receiving area 109 of sleeve 100, is minimized. Accordingly, the inner diameter of firestop ring 200 may be sized so as to be very close to the (outer) diameter of sleeve 100 in ring-receiving area 109. Particularly if it is desired that a friction fit be used to at least partially assist in detachably retaining firestop ring 200 on sleeve 100, the as-produced inner diameter of firestop ring 200 can be chosen to be slightly less than the outer diameter of sleeve 100 in ring-receiving area 109 (such a configuration may be most useful if firestop ring 200 is at least slightly elastomerically expandable). If firestop ring 200 is sufficiently conformable, the upper portion of ring 200 (i.e., that closest to upper edge 203) can be deformed radially inward so as to minimize any gaps between outer surface 101 of sleeve 100 and inner surface 201 of ring 200 when firestop ring 200 is detachably mounted upon sleeve 100. (Such deformation can be performed before or after firestop ring 200 is detachably mounted upon sleeve 100).

In a further embodiment, firestop ring 200 can be designed such that inner surface 201 comprises a taper that closely matches the taper of the sleeve 100 to which firestop ring 200 is to be detachably mounted. In such an embodiment, the body of firestop ring 200, including outer surface 202, can be tapered (such that thickness "t" of firestop ring 200 is relatively constant); or, outer surface 202 can be relatively untapered (with thickness "t" of firestop ring 200 thus being greater at upper edge 203 and less and lower edge 204).

If desired, a sealing ring can be provided to further reduce the possibility of liquid concrete penetrating between outer surface 101 of sleeve 100, and inner surface 201 of firestop ring 200. Such a sealing ring can comprise, for example, an annular sealing ring (i.e., lid) with an inner diameter that closely matches the outer diameter of sleeve 100 at the location at which upper edge 203 of firestop ring 200 will reside, and an outer diameter that is at least slightly greater than the inner diameter of firestop ring 200. When firestop ring 200 is in place on sleeve 100, such a sealing ring can be positioned adjacent to upper edge 203 of firestop ring 200 such that the sealing ring substantially covers any gap between outer surface 101 of sleeve 100, and inner surface 201 of firestop ring 200. Such a sealing ring can be supplied premounted atop firestop ring 200 (e.g., adhesively bonded to upper minor surface 203a of firestop ring 200), or can be placed atop firestop ring 200 at the construction site. Such a sealing ring can be configured to be removed after the pouring and solidification of the concrete; or, such a sealing ring can be configured to remain in place in the formed through-penetration. In the latter instance, the sealing ring may also serve as a smoke and/or water seal.

With reference to FIG. 2, the result of the above-described methods is that firestop ring 200 is detachably mounted on outer surface 101 of ring-receiving area 109 of sleeve 100. Sleeve 100 is then placed (typically, attached) upon form 113, after which concrete is poured and solidified. Pouring and solidifying the concrete serves to form a void space corresponding to sleeve 100, and also serves to securely attach firestop ring 200 to the concrete (to minimize the chance of firestop ring 200 being undesirably removed from the through-penetration with the removal of sleeve 100, and also to minimize the chance of firestop ring 200 being dislodged upon subsequent insertion of a pipe through the through-penetration). Such attaching of firestop ring 200 to the concrete may occur by way of the concrete bonding directly to at least some portion of firestop ring 200; or, by way of the concrete forming some obstruction that physically prevents the removal of firestop ring 200; or, by some combination of both mechanisms.

Firestop ring 200 and/or sleeve 100 can be designed to enhance the degree to which firestop ring 200 is securely held by the solidified concrete. For example, in one configuration, firestop ring 200 and/or sleeve 100 can be configured such that when ring 200 is placed in position on sleeve 100, a small space (e.g., from 1-10 mm wide) is present between at least a portion of lower edge 204 (e.g., lower minor surface 204a) of firestop ring 200, and upper surface 105 of flange 104. Such a space may allow liquid concrete to flow into the space and solidify to form a projection (e.g., a flange or lip) of solidified concrete below firestop ring 200, which may physically obstruct the removal of firestop ring 200, thus enhancing the securing of firestop ring 200 in place in the solidified concrete.

It is also possible to enhance the degree to which the liquid concrete can bond directly to firestop ring 200 (or to any cover layer, wrapping, encapsulant, etc. present on outer surface 202 of firestop ring 200). Thus, firestop ring 200 or any of the aforementioned layers etc. can be treated (for example with a primer, surface treatment, bonding agent, wetting agent, tie layer, etc., to chemically enhance any bonding that occurs. Or, firestop ring 200 can be configured or processed to physically enhance any bonding that occurs. For example, outer surface 202 of firestop ring 200 can be textured, structured, roughened, embossed, pleated, and the like, so as to provide an enhanced ability for liquid concrete to interact with the surface and bond thereto. In one embodiment of this type, a cover layer, wrap, encapsulant, etc., can be used that comprises surface texture, porosity, etc., so as to enhance the ability of liquid concrete to interact with the cover layer and bond thereto. (Although the term "concrete" is used generally herein, it is noted that this term is intended to broadly refer to any cementitious construction material that is poured and subsequently solidified.)

Figure 3:
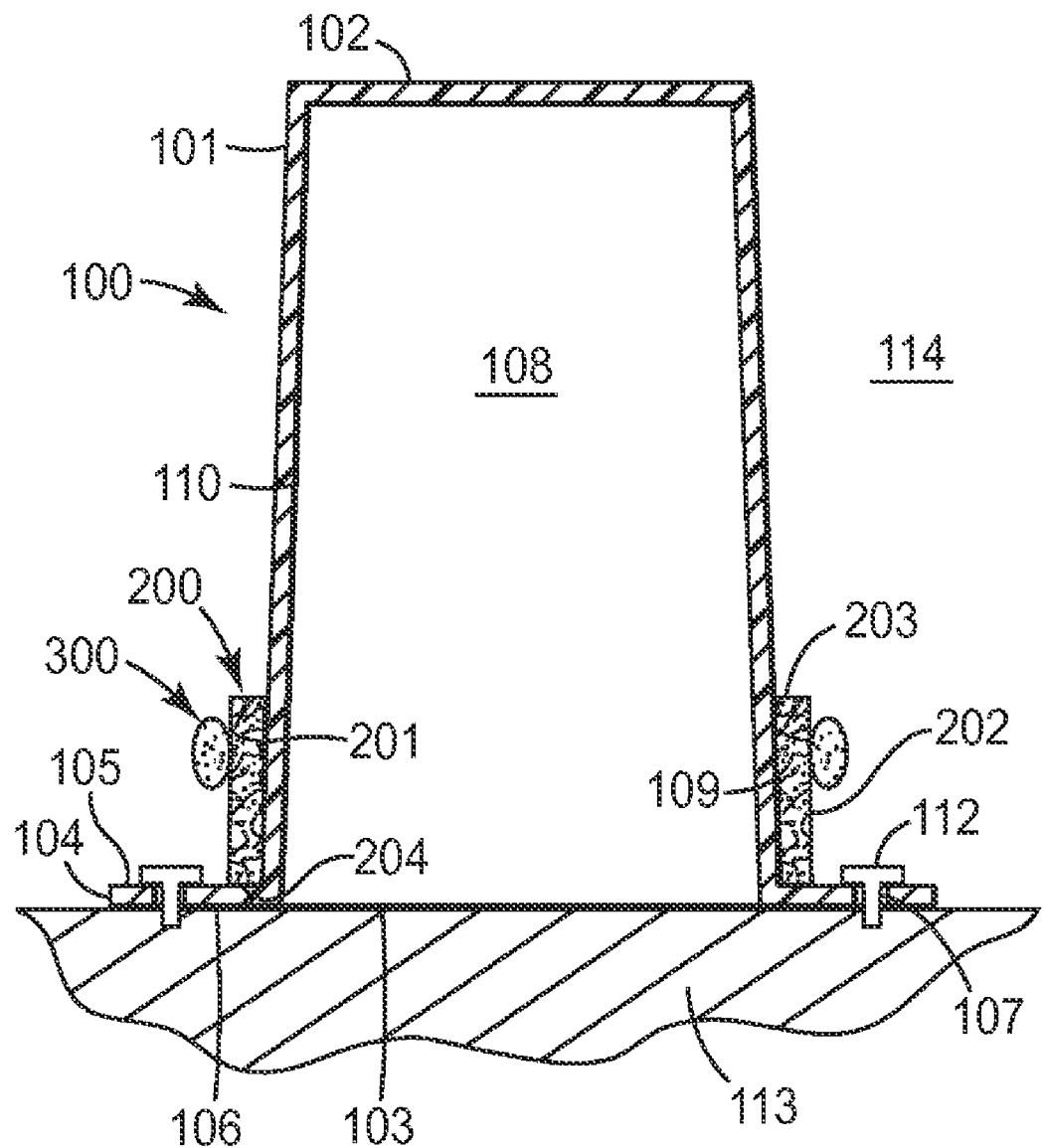
FIG. 3 is a cross sectional view of an exemplary firestop ring positioned on an exemplary sleeve, the firestop ring comprising a retainer.

In one embodiment, at least one retainer 300 may be provided on firestop ring 200, to enhance the ability of the concrete to retain and hold firestop ring 200 in position. A generic representation of a retainer 300 is shown in FIG. 3. If present, retainer 300 should be connected to, and adequately secured to, firestop ring 200. Retainer 300 should be configured such that liquid concrete can interact with retainer 300 such that when the concrete is solidified, retainer 300 (hence firestop ring 200) is adequately secured to the concrete. While not wishing to be limited by theory or mechanism, such a retainer 300 can function according to two general mechanisms. The first mechanism is one in which retainer 300 is designed (e.g., shaped) such that liquid concrete can at least partially surround or encapsulate the exterior of at least a portion of retainer 300 such that when the concrete is solidified, retainer 300 is securely held. The second mechanism is one in which retainer 300 is designed such that liquid concrete can at least partially penetrate the interior of at least a portion of retainer 300 such that when the concrete is solidified, retainer 300 is securely held.

Figure 4:
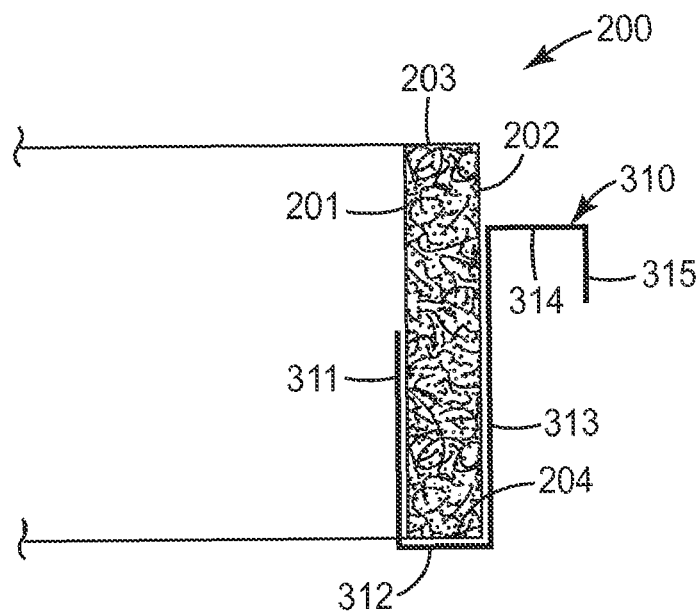
FIG. 4 is a cross sectional view of a portion of an exemplary firestop ring, with an exemplary retaining bracket in position on the firestop ring.

In one embodiment of retainer 300 that functions according to the first mechanism, retainer 300 comprises retaining bracket 310 pictured in an exemplary manner in FIGS. 4 and 4a. Exemplary retaining bracket 310 comprises at least one protruding portion 314 that extends outward (at any suitable angle) with respect to outer surface 202 of firestop ring 200, such that liquid concrete is able to encapsulate at least a part of protruding portion 314. Solidification of concrete at least partially around a part of protruding portion 314 can thus enhance the ability of the solidified concrete to securely hold retaining bracket 310.

In various embodiments, protruding portion 314 can be designed to further enhance the ability of concrete to encapsulate and securely hold retaining bracket 310. In the exemplary embodiment of FIGS. 4 and 4a, protruding portion 314 comprises an additional "nailhead" portion that is connected to portion 314 and protrudes at an angle therefrom (an angle of about 90 degrees is shown in FIG. 4, but any suitable angle can be chosen). In this embodiment, protruding portion 314 and/or nailhead portion 315 can be positioned as desired (that is, at any angle, and with any length of portions 314 and 315), as long as the desired function is provided.

Many other enhanced designs of such a protruding portion 314 of a retaining bracket 310 are possible. In some designs, of course, a well-defined nailhead portion may not be present. All that is needed is that protruding portion 314 be able to be at least partially surrounded by liquid concrete in a manner that enhances the securing of retaining bracket 310 to the solidified concrete. Thus, any design in which protruding portion 314 deviates from a flat, planar, continuous sheet, or in which protruding portion 314 has an additional component attached thereto, may be useful. For example, protruding portion 314 may be designed in a hook or J shape (somewhat akin to the design of FIGS. 4 and 4a, except that protruding portion 314 may blend into nailhead portion 315 rather than being connected at a specific joint). Or, protruding portion 314 may be twisted (e.g., into a corkscrew shape), as in the exemplary design of FIG. 4b. Protruding portion 314 may be bifurcated, as in the exemplary design of FIG. 4c. Protruding portion 314 may be pleated, accordionized, corrugated, looped etc. (not shown in any Figure), and/or may have such pleated etc. structures attached thereto. Protruding portion 314 may have one or more holes present, as shown in FIG. 4b. In summary, any design of protruding portion 314 that deviates from a flat, planar, uninterrupted structure, in order to provide enhanced ability of concrete to securely hold retaining bracket 310, is within the designs contemplated by the inventor.

Retaining bracket 310 can also comprise an outer portion 313 (so designated because it is designed to be placed adjacent to at least a portion of outer surface 202 of firestop ring 200), as shown in FIG. 4. Outer portion 313 of bracket 310 may contact outer surface 202 of firestop ring 200 and in certain embodiments may be attached to surface 202 of firestop ring 200, for example, by a layer of double-faced adhesive, not shown in any figure (if so attached directly to surface 202 of firestop ring 200, one or both of the below-discussed portions 312 and/or 311 of bracket 310 may not be necessary.)

In some embodiments, retaining bracket 310 is attached to firestop ring 200 mechanically; that is, by the combined pressure exerted by bracket portions 313, 312 and/or 311 on firestop ring 200. Thus in these embodiments bracket 310 can comprise inner portion 311 (so designated because it is designed to be placed adjacent to at least a portion of inner surface 201 of firestop ring 200) as shown in FIG. 4. Inner portion 311 of bracket 310 may contact at least a portion of inner surface 201 of firestop ring 200. Inner portion 311 may thus help secure firestop ring 200 and may also protect inner surface 201 of firestop ring 200 (e.g., from damage when a pipe is inserted through the firestopped through-penetration).

Figure 8:
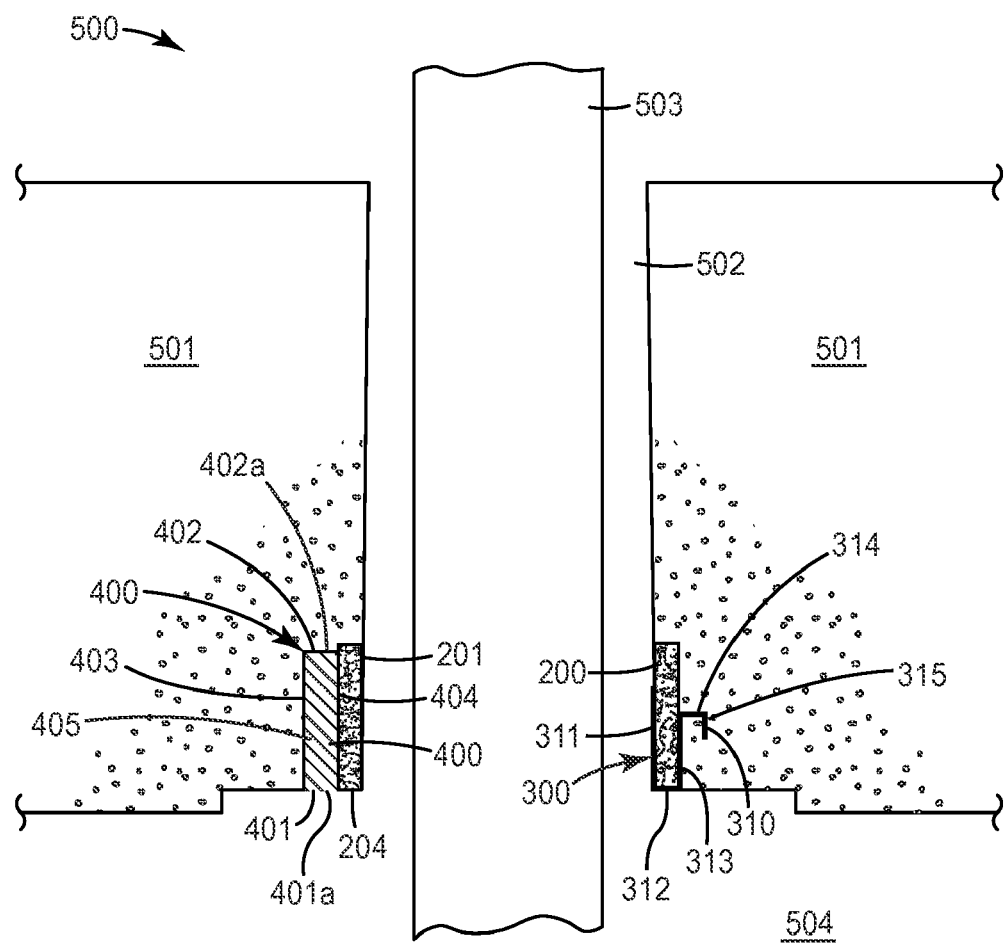
FIG. 8 is a cross sectional view of a concrete partition comprising an exemplary firestop ring installed according to methods disclosed herein.

With reference to FIG. 4, in some embodiments bracket 310 can also comprise a cradle portion 312 which is adjacent lower edge 204 of firestop ring 200 and which serves at least to connect outer portion 313 and inner portion 311 of bracket 310 (if present). Cradle portion 312 may contact lower edge 204 (e.g., lower minor surface 204a) of firestop ring 200 and can serve to support firestop ring 200 if so contacting lower edge 204. (If sufficient pressure is jointly applied between retaining bracket portions 313 and 311 onto firestop ring surfaces 202 and 201 respectively, firestop ring 200 may be securely held by retaining bracket 310 even if cradle portion 312 does not contact lower edge 204 of firestop ring 200.) Cradle portion 312 can also serve to protect lower minor surface 204a of firestop ring 200 from damage when a pipe is inserted through the firestopped through-penetration (as shown in FIG. 8).

Any or all of the components of retaining bracket 310 may be designed for optimum performance in enhancing the ability of the solidified concrete to securely hold firestop ring 200. Such components and features of retaining bracket 310 may also serve other functions. In addition, of course, they should not detract from the ability of firestop ring 200 to function properly. The design of retaining bracket 310, and the materials of its construction, can be selected accordingly. For example, the length, breadth, and/or thickness of inner portion 311, and the material of construction, can be chosen such that inner portion 311 does not unacceptably prevent the expansion of firestop ring 200 radially inwards upon exposure to sufficiently high temperature. Thus, in one embodiment, inner portion 311 of retaining bracket 310 is deflectable such that upon expansion of firestop ring 200 radially inwards, at least a part of portion 311 can deflect radially inwards so as to allow the expansion. Such deflection may occur by way of portion 311 being bendable or deformable; or by way of portion 311 being breakable (e.g., by a breakable connection or line of weakness being present somewhere within portion 311 or at the junction of portion 311 and portion 312). In this context, the concept of "deflectable" also encompasses such materials as are deformable and/or removable by melting, burning, disintegrating, and the like.

The materials of construction of retaining bracket 310 can be chosen as desired. (The various portions of retaining bracket 310 can be made separately, of separate materials, which are joined together; however, in most applications it may be preferred that bracket 310 comprise an integral structure with all parts comprised of the same material.) For example, metal may be used, in view of the excellent thermal conductivity of metal (which may be desirable in order to have the firestop material more rapidly exposed to heat, in the event of a fire). Or, a polymeric material may be used. If desired, the polymeric material can be selected such that it does not significantly melt, flow, disintegrate, etc., prior to burning (thus in such a case, a thermoset material may be chosen rather than a thermoplastic material). If desired, the polymeric material can comprise a flame resistant or flame retardant material.

If desired, the design or materials of construction of retaining bracket 310 can be chosen to enhance the ability of (hot) air to contact portions of firestop ring 200 (which may enhance the rapidity with which firestop ring 200 can respond to an elevated temperature). Thus, for example, if it is desired to enhance the ability of air to contact inner surface 201 of firestop ring 200), one or more holes may be provided in inner portion 311 of retaining bracket 310 (as shown in an exemplary manner in FIG. 4c). Similarly, if it is desired to enhance the ability of air to contact lower edge 204 (e.g., lower minor surface 204a) of firestop ring 200, one or more holes may be provided in cradle portion 312 of retaining bracket 310 (as shown in an exemplary manner in FIG. 4b). In a variation of this approach, any or all of inner portion 311, cradle portion 312, and outer portion 313 of retaining bracket 310, may be made of a discontinuous material, for example a mesh, screen, or the like.

The thickness of the material may be selected in combination with the material composition and size, in order to provide optimum properties. For example, exemplary retaining brackets as shown in FIG. 4 may be made from a piece of metal (e.g., steel, aluminum, etc.) in the general range of about 20 gauge to about 30 gauge.

Figure 4D:
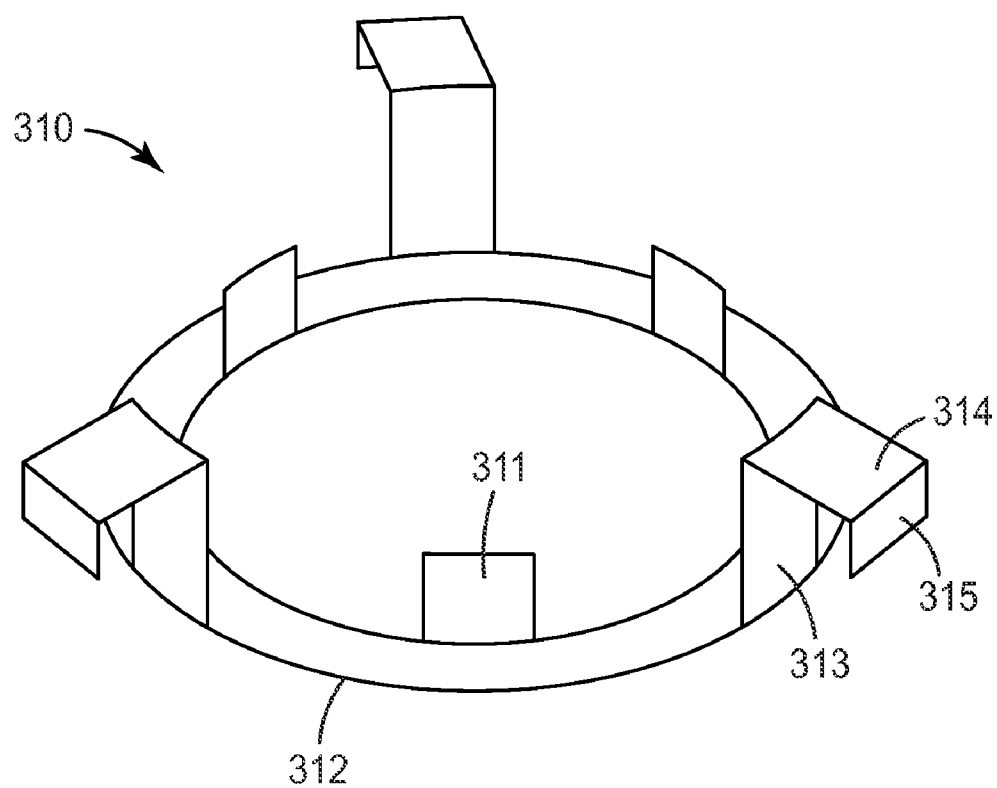

Retaining brackets as envisioned herein can comprise any suitable design and arrangement. For example, one or more individual retaining brackets can be circumferentially spaced at various locations around firestop ring 200. In another embodiment, any or all of various portions of such a retaining bracket can be designed so as to extend partially or completely around the circumference of firestop ring 200. For example, any or all of inner portion 311, cradle portion 312 and outer portion 313 can be provided as a ring so as to form a collar, from which one or more individual protruding portions 314 can be provided. For example, the exemplary retaining collar pictured in FIG. 4*d* comprises a cradle portion 312 which is in the form of a continuous collar, with three circumferentially spaced outer portion 313/protruding portion 314/nailhead portion 315 assemblies connected thereto, and additionally with three circumferentially spaced inner portions 311 connected thereto. (In this exemplary embodiment, the inner portions are in staggered relation to the outer/protruding/nailhead assemblies).

Although not shown in any Figure, retaining bracket 310 can, if desired, comprise a portion that is adjacent upper edge 203 of firestop ring 200. In one embodiment of such a design, retaining bracket 310 comprises a structure that passes around the entirety of firestop ring 200. Such a structure can take the form of a loop that substantially encloses firestop ring 200 and that has a portion (e.g., a terminal portion) that protrudes outward (relative to outer surface 202 of firestop ring 200) therefrom. This type of structure (often referred to in general as a banding strip, bundling strap, etc., as shown for example in US Patent No. D505064) may comprise a loop that is somewhat rounded in shape (rather than the relatively straight portions, joined at relatively sharp corners, shown in the exemplary depictions of FIGS. 4-4*d*). Structures of this general type are within the designs contemplated by the inventor.

Retaining bracket 310 can if desired include features by which retaining bracket 310 can be manually secured to the solidified concrete (such features may be in place of, or in addition to, the above-described features which serve to secure the bracket to the concrete in the act of solidifying the concrete). For example, retaining bracket 310 can comprise one or more tabs containing holes through which nails, screws or other fastening means may be used to secure the tab (hence the bracket) to the solidified concrete.

As mentioned above, a second general mechanism by which retainer 300 may operate is one in which retainer 300 is designed such that liquid concrete can at least partially penetrate into at least a portion of the retainer such that when the concrete is solidified the retainer is securely held.

Figure 5:
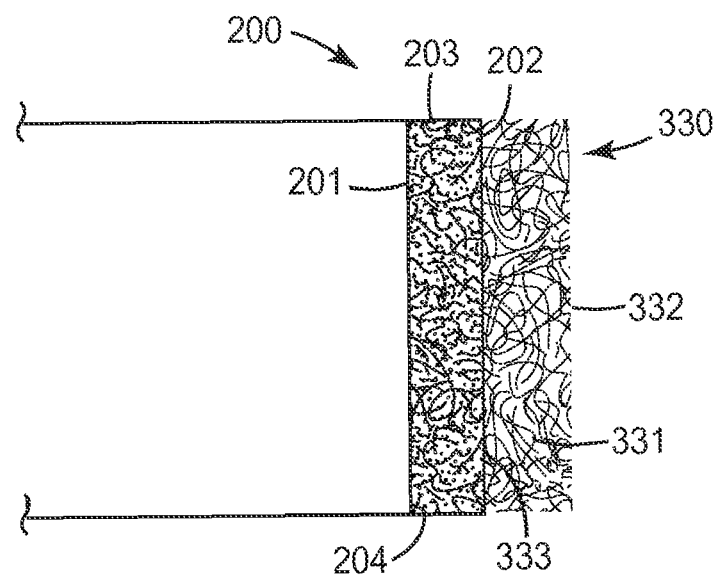
FIG. 5 is a cross sectional view of a portion of an exemplary firestop ring, with an exemplary retaining sheet in position on the firestop ring.

In one embodiment of retainer 300 that functions according to this second mechanism, retainer 300 comprises porous retaining member 330 pictured in an exemplary manner in FIG. 5. In FIG. 5, porous retaining member 330 comprises a sheet of porous material comprising porous interior 331 and porous outer surface 332. Porous retaining member 330 can be attached to firestop ring 200 by any suitable method. For example, inner surface 333 of porous retaining member 330 can be bonded to outer surface 202 of firestop ring 200, e.g. by use of a double-faced adhesive layer (not shown in FIG. 5). Other arrangements and methods of fastening are possible (for example, mechanical fastening, etc.). Regardless of the specific design, shape, etc., of porous retaining member 330, and of the method of fastening it to firestop ring 200, the basic feature of such a member is that it is provided with porosity such that liquid concrete can penetrate at least partially into the member. Subsequent solidification of the concrete thus results in secure attachment of the member (hence of firestop ring 200) to the concrete. As such, porous retaining member 330 broadly encompasses any material that possesses porosity so as to provide this function. For example, porous retaining member 330 can comprise a sheet of fibrous material of relatively large pore sizes (such that liquid concrete can penetrate at least partially into the interior of the material). Commercially available materials may find use in this application. The material may be polymeric (e.g., materials such as the widely known SCOTCHBRITE materials available from 3M Company), or inorganic (e.g., sintered ceramic materials, materials comprising inorganic fibers, and the like). The category of inorganic materials also includes porous metals (e.g., metal meshes, screens, fibrillated metals, sintered metals, and the like).

Of course, certain structures and/or materials may not be easily categorized into the above-listed first and second general retaining mechanisms. That is, certain structures may exhibit features of both. For example, a porous structure can be utilized that is shaped in a configuration such that a retaining function occurs both by concrete at least partially penetrating into the porous interior of the material, and by concrete at least partially surrounding the exterior of the structure. For example, the retaining brackets depicted in FIGS. 4-4*d* could be designed such that at least protruding portion 314 is made of a porous and/or discontinuous material such as a mesh or screen (whether metal, polymeric, ceramic, etc.), a fibrillated metal, a perforated metal, and the like. If desired, retainers relying on both types of mechanisms can be used in combination. That is, one or more retaining brackets 310 can be used in combination with one or more porous retaining members 330.

It may be desirable to provide one or more optional insulating spacers such that when firestop ring 200 is installed in the through-penetration, an enhanced amount of thermal insulation is provided between at least a portion of firestop ring 200 and the solidified concrete. Such an enhanced amount of thermal insulation may reduce the tendency for the concrete to act as a heat sink, thus enhancing the ability of firestop ring 200 to respond quickly in the event that a rise in temperature (e.g., due to a fire) is encountered.

Figure 6:
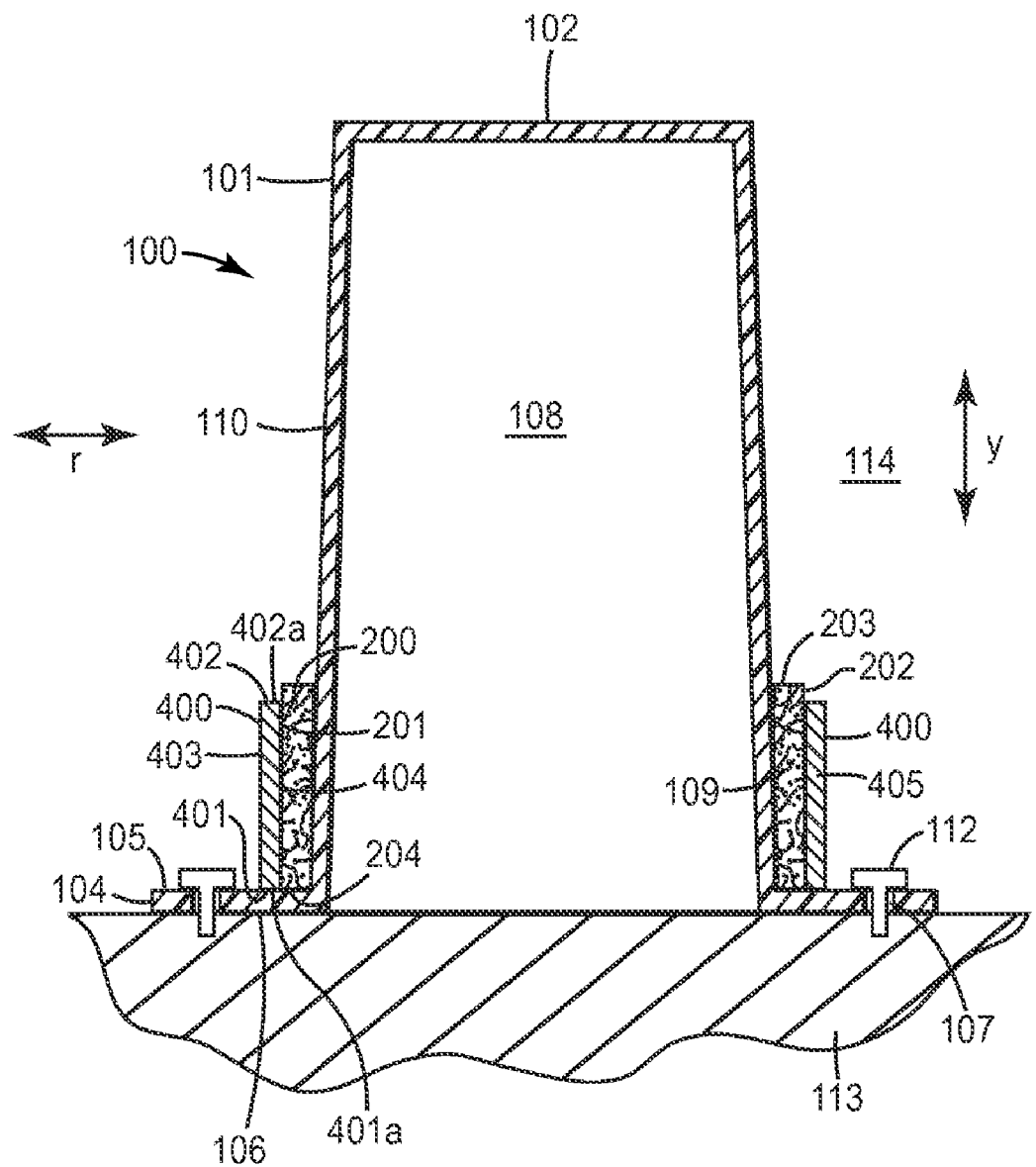
FIG. 6 is a cross sectional view of an exemplary firestop ring positioned on an exemplary sleeve, the firestop ring comprising an exemplary insulating spacer.

Accordingly, shown in FIG. 6 is a generic representation of a firestop ring 200 bearing at least one insulating spacer 400. Insulating spacer(s) 400 can in one embodiment comprise a layer of insulating material which is positioned adjacent to a portion or all of outer surface 202 of firestop ring 200. In one embodiment, insulating spacer 400 comprises inner surface 404, outer surface 403, lower edge 401, and upper edge 402 (which may comprise lower and upper minor surfaces 401*a* and 402*a*, respectively), with inner surface 404 of insulating spacer being proximal to outer surface 202 of firestop ring 200, with outer surface 403 of insulating spacer 400 being distal to outer surface 202 of firestop ring 200, with lower edge 401 being proximal to lower edge 204 of firestop ring 200, and with upper edge 402 being distal to lower edge 204 of firestop ring 200. In one specific embodiment, at least a portion of inner surface 404 of insulating spacer 400 is attached (e.g., by a layer of double faced adhesive) to outer surface 202 of firestop ring 200. In an alternative embodiment, insulating spacer 400 can be provided as a piece which is not attached directly to surface 202, but rather is provided adjacent to surface 202 and is held there by a method other than direct (e.g. adhesive) attachment to surface 202. For example, insulating spacer 400 can be provided as an annular ring of insulating material with an inner diameter slightly larger than the outer diameter of firestop ring 200. The two rings can then be placed together in overlapping concentric relation and held together, for example by use of at least one retaining bracket 310 which is designed (e.g., by the width of cradle portion 312 and/or the distance between outer portion 313 and inner portion 311) to accommodate the combined thickness of firestop ring 200 and the insulating ring.

Insulating spacer 400 can be present completely around the perimeter of firestop ring 200 (e.g., as an above-described insulating ring); or, insulating spacers 400 can be present as discontinuous pieces that are circumferentially spaced around the perimeter of firestop ring 200. For example, discrete pieces of insulating spacer 400 can be interspersed circumferentially with retainers 300, around the perimeter of firestop ring 200.

However provided, insulating spacer 400 can be comprised of any suitable material that serves to reduce thermal conduction between firestop ring 200 (or any encapsulant, wrap, etc., present on surface 202), and the solidified concrete. Thus, any material with a relatively low thermal conductivity may be used for insulating spacer 400, including common polymeric materials, ceramics, and the like.

In a particular embodiment, insulating spacer 400 comprises an at least partially air-filled material. Such a material can comprise for example a foam (open or closed cell), a fibrous material (such as a nonwoven, a knitted or woven material), a reticulated material, a mesh or screen, a material with pockets of air, a honeycomb, and the like. Such an insulating spacer can take advantage of the relatively low thermal conductivity of air to at least partially thermally isolate firestop ring 200 from the adjacent concrete.

In a particular embodiment, the at least partially air-filled material is transmissive to air through at least a portion of its interior (for example, is comprised of an open cell foam as opposed to a closed cell foam). In an additional feature of this particular embodiment, lower minor surface 401a of insulating spacer 400 is transmissive to air (e.g., permits entry of air, if not blocked by some exterior structure). Thus with reference to FIG. 6, in such an embodiment insulating spacer 400 comprises a structure with an at least partially air-transmissive interior, and further comprises lower minor surface 401a which, when firestop ring 200 is installed in a through-penetration (i.e., after the removal of sleeve 100), is open to the atmosphere. Such an arrangement can allow entry of air into insulating spacer 400, via lower minor surface 401a, such that air can penetrate near, or to, outer surface 202 of firestop ring 200. Such an arrangement can not only enhance the thermal isolation of firestop ring 200 from the concrete, it can, in allowing the entry of (hot) air into insulating spacer 400, further enhance the ability of firestop ring 200 to rapidly respond to the presence of hot air.

Thus in this embodiment, insulating spacer 400 comprises an air-transmissive material. Such materials include for example air-transmissive porous materials (e.g., certain fibrous materials, open-cell foam materials, nonwoven materials, woven or knitted materials, reticulated materials, membranes, etc.), which may be polymeric, mineral/ceramic, metallic, etc.

In a further embodiment, insulating spacer 400 comprises an at least partially air-transmissive material that has at least one dimension along which the material that can resist, either partially or completely, the ability of liquid concrete to penetrate into it. Such materials include porous materials (e.g., as mentioned above), which are designed or selected to be transmissive to air but to resist the ability of liquid concrete to wet and penetrate into the material (along at least one axis). Such an ability to permit flow of air but to substantially prevent flow of liquid concrete can be achieved by proper choice of the pore size, fiber size, surface wetting, etc., properties of the porous material.

An embodiment of an at least partially air-transmissive material that has at least one dimension along which the material can resist the ability of liquid concrete to penetrate into it includes such materials as contain at least one conduit by which air can penetrate through the spacer in a direction toward upper edge 203 of firestop ring 200. (In this context, the aforementioned porous air-transmissive materials can be considered to be materials which contain a multiplicity of such air-transmissive conduits). Thus in various embodiments, an insulating spacer 400 comprising a material with pleats, corrugations, channels, etc. (which provide at least one conduit for air flow), can be used, in which the conduit(s) is oriented so as to allow air to be transmitted through spacer 400 in a direction generally toward upper edge 203 of firestop ring 200. In a specific embodiment, such channels can be oriented generally parallel to the "y" axis of FIG. 6. However, such channels can be oriented at any angle (e.g., 25 degrees, 45 degrees, 65 degrees, etc. away from the "y" axis) as long as the channels allow air to flow in the general direction of upper edge 203.

In this embodiment, insulating spacer 400 comprises (at least) one dimension comprising substantially air-transmissive conduits as described above, and also comprises at least one dimension which is substantially impenetrable by liquid concrete. In a specific embodiment of this type, insulating spacer 400 contains air-permeable conduits oriented so as to permit transmission of air generally toward upper edge 402 of spacer 400, and is impenetrable to liquid concrete along the radial axis "r" of FIG. 6. Such an insulating spacer can comprise, for example, a channeled or corrugated structure with channels running generally parallel to the "y" axis of FIG. 6, and with a water-impervious cover sheet covering outer surface 403 of insulating spacer 400. Or, such an insulating spacer can comprise a porous (e.g., fibrous), air-transmissive material with a water-impervious cover sheet covering outer surface 403.

In the above-described embodiments, it may be useful to cover, seal, or otherwise treat to make substantially impenetrable to liquid concrete, upper minor surface 402a of insulating spacer 400.

In certain embodiments, insulating spacer 400 can be comprised of a material that will melt, disintegrate, burn, etc., in such a manner that will increase the ability of (hot) air to penetrate upwards (e.g., toward upper edge 203 of firestop ring 200). In a particular embodiment of this type, an open-ended, air-filled cavity can be provided in a firestopped through-penetration (e.g., between at least a portion of firestop ring 200 and the surrounding concrete), by the use of a sacrificial material that will (partially, substantially, or completely) melt, burn, disintegrate, etc., in response to heat. In such an embodiment, it may not be necessary to use an initially air-filled and/or air-transmissive (e.g., porous) material. Rather, a removable spacer may be used which comprises a solid material (for example, a wax ring) that will melt, burn, disintegrate, etc., to leave an at least partially empty (air-filled) open-ended space cavity between at least a portion of firestop ring 200, and the surrounding concrete.

In a variation of this embodiment, the spacer material does not necessarily have to be removable by the application of heat (e.g., by melting, burning, etc.), but rather can be physically removed. For example, such a temporary spacer can comprise a material that can be removed (e.g., intact in a single piece, or in the form of particles, by abrading) after pouring and solidification of concrete, to leave an at least partially empty (air-filled) open-ended cavity between at least a portion of firestop ring 200, and the surrounding concrete.

In certain embodiments, the above-described porous retaining member 330 can also serve as an insulating porous layer. Such a function can be achieved by designing porous retaining member 330 to have properties (porosity, density, wettability, etc.) and dimensions such that liquid concrete can penetrate sufficiently into the porous interior 331 of porous retaining member 330 to adequately secure member 330 (thus firestop ring 200) to the solidified concrete, but such that liquid concrete does not penetrate so completely into the porous interior 331 of porous retaining member 330 so as to completely fill the porous interior such that an insulating function of member 330, and/or an air-transmissive function of 330, is compromised or destroyed.

Although referred to in general herein as a ring and described as being suitable for placement upon a generally cylindrical frusto-conical sleeve, the firestop ring disclosed herein can be formed into any suitable shape (e.g., oval, square, rectangular, etc., in cross section, as viewed along axis "y" of FIG. 2) that enables the firestop ring to be properly positioned upon a sleeve of a particular shape. That is, if a sleeve of oval or square cross section is used, a firestop "ring" 200 of oval or square shape can be used to match. In such a case, terms used herein such as ring, diameter, circumference, etc., are understood to correspond to the equivalent parameters for such noncircular sleeves.

In conventional use, sleeve 100 is usually at least slightly tapered; however, if desired sleeve 100 can be untapered (e.g., a straight cylinder) at long as this does not unduly interfere with the functioning of sleeve 100. In conventional use, widest end 103 of sleeve 100 is usually open and narrowest end 102 of sleeve 100 is usually closed. However, if desired, widest end 103 could be closed, and/or narrowest end 102 could be open, as long as this does not unsatisfactorily interfere with the functioning of sleeve 100.

While the methods and devices disclosed herein can be used with existing sleeves, certain optional features may be provided on sleeves to enhance the functioning of the firestop ring. Thus, certain features are shown in an exemplary manner in FIG. 7. One such feature is retaining feature 111 (which may comprise a flange of a few mm in height, or may be a stub of a mm or less in height) that protrudes from the upper surface 105 of flange 104. Such a retaining feature may help to position and retain firestop ring 200 in place upon sleeve 100. In addition, such a feature may help to minimize the ability of liquid concrete to penetrate between upper surface 105 of flange 104, and lower edge 204 of firestop ring 200, if this is desired. In a further embodiment, feature 111 can be designed (e.g., of sufficient height and located sufficiently close to outer surface 202 of firestop ring 200) to function as the afore-mentioned removable spacer (thus, upon removal of sleeve 100 from the solidified concrete, an open-ended cavity is left behind in the space formerly occupied by feature 111).

Another optional feature is retaining feature 115 (which may comprise a flange of a few mm in height, or may be as subtle as a flange of a mm or less in height) that protrudes radially outward from outer surface 101 of main body 110 of sleeve 100, at the uppermost end of ring-receiving area 109 of sleeve 100. Such a retaining feature may help to position and retain firestop ring 200 in place upon sleeve 100. In addition, such a feature may help to minimize the ability of liquid concrete to penetrate between outer surface 101 of main body 110 of sleeve 100, and inner surface 201 of firestop ring 200.

Features 115 and 111 can be provided as continuous features (e.g., rings); or, they can be provided as one or more individual, discrete features spaced around the main body and/or flange of sleeve 100. If present features 111 and 115 should be designed so that they do not unduly affect the ability to detachably mount firestop ring 200 upon sleeve 100, to remove sleeve 100 from solidified concrete if desired, and so on.

Figure 7:
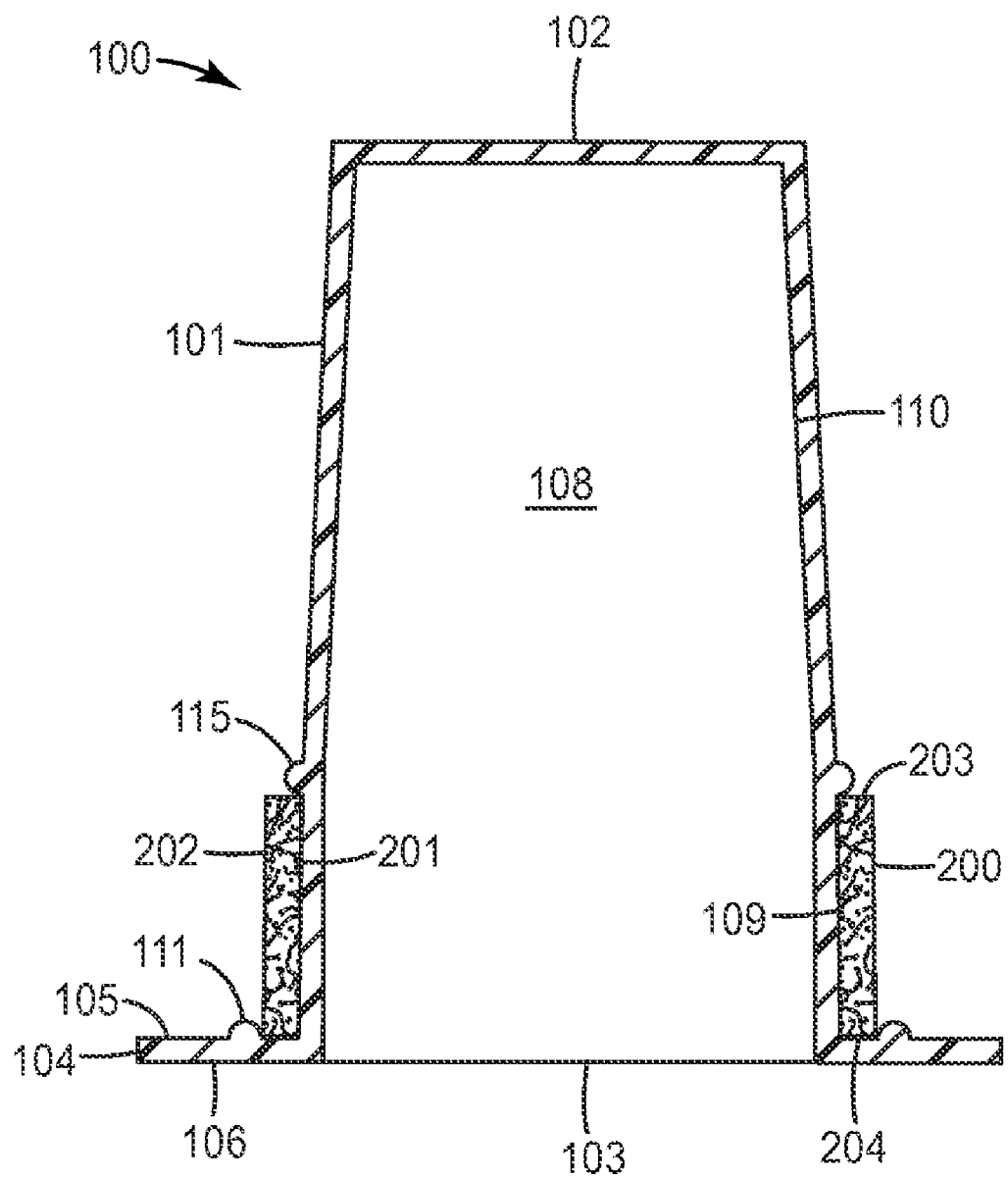
FIG. 7 is a cross sectional view of an exemplary firestop ring positioned on an exemplary sleeve.

Another optional feature which may enhance the performance of firestop ring 200 is shown in FIG. 7. In FIG. 7, ring-receiving area 109 of main body 110 of sleeve 100 is not tapered. Thus, the ability of firestop ring 200 to be friction fitted to sleeve 100 may be improved, and any gap between outer surface 101 of sleeve 100, and inner surface 201 of firestop ring 200 (resulting from the taper of main body 110 of sleeve 100), may be minimized (thus minimizing the ability of liquid concrete to penetrate between outer surface 101 of main body 110 of sleeve 100, and inner surface 201 of firestop ring 200). In such a case, the remaining portion of main body 110 of sleeve 100 (between ring-receiving area 109 and narrowest end 102) can still be tapered, if desired.

With respect to FIGS. 3 and 8, methods disclosed herein comprise placing a firestop ring 200 in position upon a sleeve 100; positioning sleeve 100 upon a form 113; pouring liquid concrete such that it fills at least a portion of space 114 exterior to sleeve 100; solidifying the concrete; and removing form 113 and sleeve 100 (whether concurrently or separately). This leaves void space (through-penetration) 502 in solidified concrete 501 as shown in FIG. 8 (features resulting from the presence of nails 112 are not shown). The act of removing sleeve 100 results in the detaching of firestop ring 200 from sleeve 100, with firestop ring 200 being securely retained in position in through-penetration 502, as shown in FIG. 8.

In the exemplary illustration of FIG. 8, a retaining bracket 310 is pictured, with concrete 501 shown having encapsulated protruding portion 314 and nailhead portion 315 of retaining bracket 310, thus enhancing the securing of firestop ring 200 to solidified concrete 501. Also shown in the exemplary illustration of FIG. 8 is an insulating spacer 400. Insulating spacer 400 comprises air-transmissive interior region 405, outer surface 403 that is impenetrable to liquid concrete, upper minor surface 402a that is impenetrable to liquid concrete, and lower minor surface 401a that is air-transmissive and is open to space 504 below concrete partition 501.

Thus shown in FIG. 8 is a through-penetration that has been firestopped by the herein-disclosed methods. (Pipe 503 is shown as having been inserted through through-penetration 502.) The placement of firestop ring 200 in position on sleeve 100, as described herein, results in firestop ring 200 being positioned at the lower end of through-penetration 502. Thus, firestop ring 200 is advantageously positioned to quickly respond (e.g., expand) upon the development of a fire in space 504 below concrete partition 501.

In one embodiment the apparatus and methods described above are such that through-penetration 502, containing an intumescent firestop ring 200, passes certain tests of firestopping ability. In a particular embodiment, through-penetration 502, containing intumescent firestop ring 200, meets the requirements of ASTM E 814-06 (as specified in 2006).

Thickness "t" of firestop ring 200 may be chosen based on the diameter of the through-penetration to be firestopped. For example, a relatively thin firestop ring 200 (e.g., around ⅛ inch thickness) may be used for a relatively small through-penetration diameter (e.g., around 2 inches), while a relatively thick firestop ring 200 (e.g., around ½ inch thickness) may be used for a relatively large through-penetration diameter (e.g., around 5 inches).

Sleeve 100 can be provided with firestop ring 200 pre-applied; or, the placement of firestop ring 200 upon sleeve 100 can be performed at the construction site (for example, if firestop ring 200 is provided separately from sleeve 100). Placement of firestop ring 200 upon sleeve 100 may be performed prior to placement of sleeve 100 upon form 113; or, this order can be reversed if desired. If a retainer(s) 300 (such as bracket(s) 310) is used in combination with firestop ring 200, retainer 300 can be pre-applied to firestop ring 200; or the placement of retainer 300 upon firestop ring 200 can be performed at the construction site. Likewise, if insulating spacer(s) 400 is used in combination with firestop ring 200, insulating spacer 400 can be pre-applied to firestop ring 200; or the placement of insulating spacer 400 upon firestop ring 200 can be performed at the construction site.

EXAMPLE

An intumescent firestop ring was made by the following procedure. INTERAM GRAPHITE MAT (ULTRA GS) was obtained from 3M Company, St. Paul, Minn., at approximately ⅛ inch thickness, 2 inches width and 16 inches length. INTERAM I-10 SERIES MAT was obtained from 3M Company, at approximately 7/32 inch thickness, 2 inches width and 16 inches length. A three layer stack was produced with the two outer layers being ULTRA GS and the middle layer being I-10. The three layers were held together by the use of 3M HIGH STRENGTH SPRAY ADHESIVE 90, obtained from 3M Company. The three layer stack was then wrapped with ALPHA-TEMP STYLE PPSA-44 laminate (obtained from Alpha Associates, Lakewood, N.J.). The stack was then deformed along the long axis of the stack so as to bring the ends of the stack together to form an annular ring. The stack was then held in this annular ring configuration by wrapping the adjacent ends of the stack with strapping tape. The result of this operation was the formation of an intumescent firestop ring of approximately 5.25 inch interior diameter and 2 inch height.

Retaining brackets were produced by obtaining 26 gauge sheet metal strips that were approximately ½ inch wide and 4 inch long. The strips were bent into retaining brackets with shapes similar to that depicted in FIGS. 4 and 4a. Three retaining brackets were attached to the intumescent firestop ring in similar manner to that depicted in FIG. 4, circumferentially spaced around the intumescent firestop ring.

A removable sleeve was obtained from Deslauriers, Inc., of Bellwood, Ill., under the trade designation ECON-O-SLEEVE 5. The sleeve was found to have a measured diameter at the widest end (adjacent to the flange) of approximately 5.25 inches. The intumescent firestop ring with the three retaining brackets attached thereto was placed over the narrowest end of the sleeve and slidably moved to a position adjacent to the flange at the widest end of the removable sleeve. The result of this operation was the providing of a removable sleeve with an intumescent firestop ring detachably mounted on the outer surface of the sleeve, adjacent the widest end of the sleeve.

A concrete slab of approximately 4.5 inch thickness was provided. An 8 inch diameter hole was core drilled into the concrete. The slab was placed atop a plywood form. The removable sleeve with the intumescent firestop ring and retaining brackets were placed within the 8 inch hole, with the flange of the removable sleeve in contact with the plywood form.

THORITE PATCHING MATERIAL was obtained from Chemrex, Shakopee, Minn. and was mixed with an appropriate amount of water and poured into the 8 inch diameter hole until approximately 4.5 inches deep, and was allowed to solidify.

After solidification, the plywood form and the removable sleeve were removed, with the intumescent firestop ring remaining behind, securely attached to the solidified THORITE. The result of these procedures was the formation of a through-penetration containing an annular ring of intumescent firestop material.

A 4 inch nominal diameter CCABS pipe was placed through the above-described firestopped through-penetration. The firestopped through-penetration with the CCABS pipe was then tested in similar manner as described in ASTM E 814-06 ("Standard Test Method for Fire Tests of Through-Penetration"), including a fire exposure of approximately three hours, followed by a hose stream exposure. (Fire exposure was from the side of the concrete slab that the annular ring of intumescent material was closest to.) No fire penetration through to the unexposed side of the concrete slab was observed during the fire exposure, and no water penetration through to the unexposed side of the concrete slab was observed during the hose stream test.

The tests and test results described above are intended solely to be illustrative, rather than predictive, and variations in the testing procedure can be expected to yield different results. The foregoing detailed description and examples have been given for clarity of understanding only. No unnecessary limitations are to be understood therefrom.

The present invention has now been described with reference to several embodiments thereof. It will be apparent to those skilled in the art that changes can be made in the embodiments described without departing from the scope of the invention. Thus, the scope of the present invention should not be limited to the exact details and structures described herein, but rather by the structures described by the language of the claims, and the equivalents of those structures.

What is claimed is:

1. A method for creating a firestopped through-penetration in a poured, solidified concrete partition, comprising:
   providing a removable sleeve with an outer surface and a widest end and a narrowest end;
   detachably mounting an intumescent firestop ring on the outer surface of the sleeve, adjacent the widest end of the sleeve, so that an inner, radially-inward-facing surface of the firestop ring is in contact with the outer surface of the sleeve;
   positioning the sleeve on a form;
   pouring liquid concrete around the sleeve and firestop ring;
   solidifying the concrete such that the firestop ring is securely held by the concrete;
   and,
   removing the sleeve from the solidified concrete to provide a through-penetration at least partially defined by the shape of the sleeve,
   wherein removing the sleeve from the solidified concrete causes the firestop ring to be detached from the sleeve and to remain in place in the through-penetration, securely held by the solidified concrete.

2. The method of claim 1 wherein when the liquid concrete is poured, liquid concrete contacts at least a portion of a surface of the firestop ring, such that when the concrete is solidified, the firestop ring is securely held by the solidified concrete at least partially by the concrete being bonded to at least a portion of a surface of the firestop ring.

3. The method of claim 1 wherein the firestop ring comprises a lower edge that is proximal to the widest end of the sleeve when the firestop ring is detachably mounted on the outer surface of the sleeve; and wherein when the liquid concrete is poured, liquid concrete penetrates into a space adjacent the lower edge of the firestop ring, such that when the concrete is solidified, the firestop ring is securely held by the solidified concrete at least partially by a flange of solidified concrete adjacent the lower edge of the firestop ring.

4. The method of claim 1 wherein the firestop ring comprises at least an outer surface and wherein the firestop ring comprises at least one retainer that comprises at least one protruding portion that protrudes outward with respect to the outer surface of the firestop ring; and wherein when the liquid concrete is poured, liquid concrete at least partially encapsulates, or at least partially penetrates, at least some part of the protruding portion of the retainer such that when the concrete is solidified the retainer and firestop ring are securely attached to the solidified concrete.

5. The method of claim 1 wherein the firestop ring comprises at least an outer surface and an upper edge and wherein the intumescent firestop ring comprises at least one insulating spacer that is provided adjacent the outer surface of the firestop ring such that, when the firestop ring is secured to the solidified concrete, the insulating spacer provides at least one conduit by which air can penetrate through the insulating spacer in a direction generally toward the upper edge of the firestop ring; and wherein the insulating spacer has at least one dimension along which it is substantially impenetrable by liquid concrete.

6. The method of claim 1 wherein the firestop ring comprises at least an outer surface and an upper edge and wherein the firestop ring comprises at least one removable spacer that is provided adjacent the outer surface of the firestop ring and that is removed after solidification of the concrete to leave behind an open-ended cavity such that air can penetrate the cavity in a direction generally toward the upper edge of the firestop ring.

7. The method of claim 1 wherein the firestopped through-penetration satisfies the requirements of ASTM E 814-06, as specified in 2006.

8. An apparatus for creating a firestopped through-penetration in a poured, solidified concrete partition, comprising:
   a removable sleeve with an outer surface and a widest end and a narrowest end;
   and,
   an intumescent firestop ring detachably mounted on the outer surface of the sleeve, adjacent the widest end of the sleeve, so that an inner, radially-inward-facing surface of the firestop ring is in contact with the outer surface of the sleeve;
   wherein the sleeve is configured to create a through-penetration in a poured concrete partition,
   and,
   wherein the sleeve and ring are arranged such that removal of the sleeve from the poured, solidified concrete partition detaches the firestop ring from the sleeve thus providing a through-penetration with an intumescent firestop ring positioned within the through-penetration.

9. The apparatus of claim 8 wherein the apparatus comprises at least one retainer attached to the firestop ring.

10. The apparatus of claim 9 wherein a plurality of retainers are circumferentially spaced along the firestop ring.

11. The apparatus of claim 9 wherein at least a portion of the retainer is attached to the outer surface of the firestop ring.

12. The apparatus of claim 9 wherein the firestop ring comprises an outer surface and wherein the retainer has at least a retaining portion that protrudes outward with respect to the outer surface of the firestop ring so as to be able to be at least partially encapsulated by, or at least partially penetrated by, liquid concrete.

13. The apparatus of claim 8 wherein the firestop ring comprises an outer surface and wherein the apparatus comprises at least one insulating spacer positioned adjacent to, and outward of, the outer surface of the firestop ring.

14. The apparatus of claim 13 wherein the firestop ring comprises an upper edge that is distal to the widest end of the removable sleeve; wherein the insulating spacer provides at least one conduit by which air can penetrate through the insulating spacer in a direction generally toward the upper edge of the firestop ring; and wherein the insulating spacer has at least one dimension along which it is substantially impenetrable by liquid concrete.

15. The apparatus of claim 14 wherein the insulating spacer comprises an air-transmissive porous material.

16. A kit for providing a firestopped through-penetration in a poured, solidified concrete partition, the kit comprising:
   at least one intumescent firestop ring having at least an outer surface and configured to be detachably mounted to the outer surface of a removable elongate sleeve, so that an inner, radially-inward-facing surface of the firestop ring is in contact with the outer surface of the sleeve; and,
   at least one retainer configured to be secured to the firestop ring,
   wherein the retainer comprises at least a protruding portion that, when the retainer is secured to the firestop ring, protrudes outward with respect to the outer surface of the firestop ring so as to be able to be at least partially encapsulated by, or at least partially penetrated by, liquid concrete, such that upon solidification of the liquid concrete the retainer and the firestop ring are securely held by the solidified concrete.

17. The kit of claim 16 wherein the kit further includes at least one removable elongate sleeve configured to provide, in a poured concrete partition, a through-penetration at least partially defined by the shape of the sleeve.

18. The kit of claim 16 wherein the kit comprises a plurality of retainers and wherein the firestop ring and retainers are configured such that multiple retainers are attachable to the firestop ring.

19. The kit of claim 16 wherein the retainer is attached to the firestop ring.

20. The kit of claim 16 further comprising at least one insulating spacer comprising an at least partially air-filled material.

21. The kit of claim 20 wherein the firestop ring comprises an outer surface and an upper edge, and wherein the insulating spacer is configured to be placed adjacent the outer surface of the firestop ring such that the insulating spacer provides at least one conduit by which air can penetrate through the insulating spacer in a direction generally toward the upper edge of the firestop ring; and wherein the insulating spacer has at least one dimension along which it is substantially impenetrable by liquid concrete.

22. The kit of claim 21 wherein the at least one insulating spacer is attached to the firestop ring.

* * * * *

UNITED STATES PATENT AND TRADEMARK OFFICE
CERTIFICATE OF CORRECTION

| | |
|---|---|
| PATENT NO. | : 8,146,305 B2 |
| APPLICATION NO. | : 13/214463 |
| DATED | : April 3, 2012 |
| INVENTOR(S) | : Brandon Lee Cordts |

It is certified that error appears in the above-identified patent and that said Letters Patent is hereby corrected as shown below:

Column 2
Line 10, delete "insulting" and insert -- insulating --, therefor.

Column 4
Line 9, delete "though" and insert -- through --, therefor.

Column 6
Line 35, delete "(in" and insert -- in --, therefor.

Column 8
Line 12, delete "(for" and insert -- for --, therefor.

Signed and Sealed this
Third Day of July, 2012

David J. Kappos
*Director of the United States Patent and Trademark Office*